United States Patent
Johansen et al.

(10) Patent No.: US 9,803,751 B2
(45) Date of Patent: Oct. 31, 2017

(54) SEAL, ENDCAP ASSEMBLY AND FILTER ASSEMBLY

(71) Applicant: Wix Filtration Corp LLC, Gastonia, NC (US)

(72) Inventors: Nikolas H. Johansen, Charlotte, NC (US); Darrell T. McKenzie, Gastonia, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 71 days.

(21) Appl. No.: 14/562,355

(22) Filed: Dec. 5, 2014

(65) Prior Publication Data

US 2016/0158674 A1    Jun. 9, 2016

(51) Int. Cl.
*F16J 15/10*    (2006.01)
*B01D 29/11*    (2006.01)
*F16J 15/32*    (2016.01)

(52) U.S. Cl.
CPC ........... *F16J 15/104* (2013.01); *B01D 29/111* (2013.01); *B01D 2201/291* (2013.01);
(Continued)

(58) Field of Classification Search
CPC ........ F16J 15/104; F16J 15/801; F16J 29/111; B01D 29/111; B01D 2201/342;
(Continued)

(56) References Cited

U.S. PATENT DOCUMENTS

2009/0127198 A1* 5/2009 Salvador ................. B01D 29/21
                                                       210/650
2012/0125823 A1* 5/2012 Smith ....................... B07B 1/38
                                                       209/363

FOREIGN PATENT DOCUMENTS

FR      2762230 A1 * 10/1998   ........... B01D 29/111
FR    EP 1254692 A1 * 11/2002  ............. B01D 29/21
(Continued)

OTHER PUBLICATIONS

Canadian Office Action of the related CA Application No. 9,214,268 dated Nov. 9, 2016.
(Continued)

*Primary Examiner* — Krishnan S Menon
*Assistant Examiner* — Waqaas Ali
(74) *Attorney, Agent, or Firm* — Honigman Miller Schwartz and Cohn LLP

(57) ABSTRACT

An apparatus is disclosed. The apparatus includes a seal having an annular body including an upper surface and a lower surface. The annular body also includes an outer side surface and an inner side surface that join the upper surface to the lower surface. The inner side surface contributes to defining an endcap-engaging surface of the seal including: a first endcap surface engaging portion that is sized for engaging a portion of an upper surface of an endcap, a second endcap surface engaging portion that is sized for engaging an outer side surface of the endcap, and a third endcap surface engaging portion that is sized for engaging a lower surface of the endcap. The annular body includes an upper portion connected to a lower portion. The upper portion of the annular body of the seal is defined by a rounded seal portion. The lower portion of the annular body of the seal is defined by a flexible tang portion and a flexible leg portion. The flexible leg portion is connected to and extends away from the rounded seal portion. The flexible tang portion is connected to and extends away from the flexible leg portion. An endcap assembly is also disclosed. A filter assembly is also disclosed.

26 Claims, 10 Drawing Sheets

(52) U.S. Cl.
CPC .... *B01D 2201/34* (2013.01); *B01D 2201/342* (2013.01); *B01D 2201/347* (2013.01); *F16J 15/32* (2013.01); *Y10S 277/91* (2013.01); *Y10S 277/944* (2013.01); *Y10S 277/946* (2013.01)

(58) Field of Classification Search
CPC ........ B01D 2201/347; B01D 2201/291; Y10S 277/944; Y10S 277/946; Y10S 277/91
See application file for complete search history.

(56) References Cited

FOREIGN PATENT DOCUMENTS

| | | |
|---|---|---|
| GB | 1418394 A | 12/1975 |
| JP | S34-9798 | 6/1959 |
| JP | S50-132350 | 10/1975 |
| JP | 2008530415 A | 8/2008 |

OTHER PUBLICATIONS

Japanese Office Action for the application No. 2015-237826 dated Apr. 3, 2017.

\* cited by examiner

SEAL, ENDCAP ASSEMBLY AND FILTER ASSEMBLY

TECHNICAL FIELD

The disclosure relates to a seal, endcap assembly and a filter assembly.

BACKGROUND

Various filters are known in the art for filtering fluid as it passes through a fluid path. Filters include, in part, filter media which removes impurities from a fluid, such as, for example, oil or fuel that passes through filter media.

In most applications, either a filter assembly or the filter media associated therewith must be periodically replaced to reduce the potential of developing unacceptably high impedance in the fluid path flow restriction.

While known filters have proven to be acceptable for various applications, such conventional filters are nevertheless susceptible to improvements that may enhance their overall performance and cost. Therefore, a need exists to develop improved filters and methodologies for forming the same that advance the art.

DESCRIPTION OF THE DRAWINGS

The disclosure will now be described, by way of example, with reference to the accompanying drawings, in which.

SUMMARY

Figure 1:
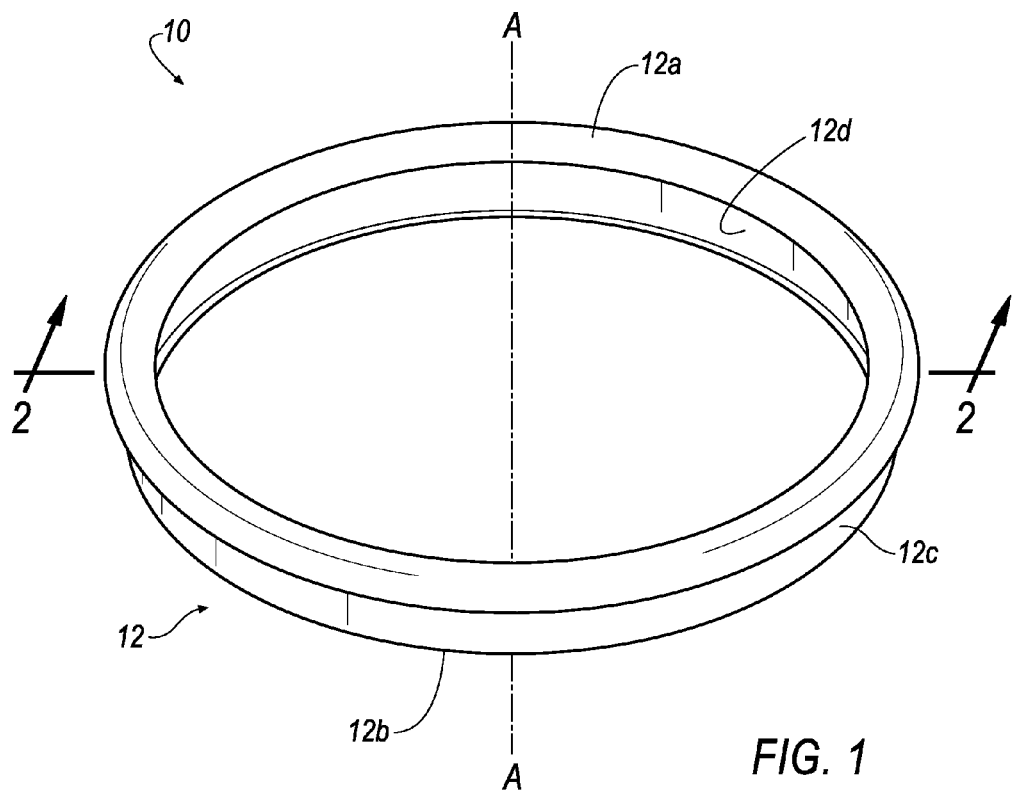
FIG. 1 is a perspective view of an exemplary seal.

One aspect of the disclosure provides an apparatus. The apparatus includes a seal. The seal includes an annular body having an upper surface and a lower surface. The annular body also includes an outer side surface and an inner side surface that join the upper surface to the lower surface. The inner side surface contributes to defining an endcap-engaging surface of the seal including: a first endcap surface engaging portion that is sized for engaging a portion of an upper surface of an endcap, a second endcap surface engaging portion that is sized for engaging an outer side surface of the endcap, and a third endcap surface engaging portion that is sized for engaging a lower surface of the endcap. The annular body includes an upper portion connected to a lower portion. The upper portion of the annular body of the seal is defined by a rounded seal portion. The lower portion of the annular body of the seal is defined by a flexible tang portion and a flexible leg portion. The flexible leg portion is connected to and extends away from the rounded seal portion. The flexible tang portion is connected to and extends away from the flexible leg portion.

In some examples, the annular body defines a geometric cross-sectional profile.

In some implementations, the geometric cross-sectional profile remains substantially constant for an entire circumference of the seal.

In some instances, the upper portion is defined by: the upper surface, an upper portion of the outer side surface, and an upper portion of the inner side surface.

In some examples, the lower portion is defined by: the lower surface, a lower portion of the outer side surface, and a lower portion of the inner side surface.

In some implementations, the rounded seal portion includes: all of the upper portion of the outer side surface, the upper surface, and a distal portion of the upper portion of the inner side surface.

In some instances, the rounded seal portion extends from a proximal end of the upper portion of the outer side surface to a proximal end of the distal portion of the upper portion of the inner side surface at an angle.

In some examples, the angle is approximately equal to 270°.

In some implementations, in addition to the distal portion of the upper portion of the inner side surface, the upper portion of the inner side surface is also defined by a proximal portion. The proximal portion of the upper portion of the inner side surface contributes to defining the first endcap surface engaging portion and a portion of the second endcap surface engaging portion.

In some instances, the flexible tang portion includes: a proximal portion of the lower portion of the outer side surface, the lower surface, and a proximal portion of the lower portion of the inner side surface.

In some examples, the proximal portion of the lower portion of the outer side surface is defined by a rounded surface portion. The proximal portion of the lower portion of the inner side surface is defined by a substantially planar surface portion that extends away from the lower surface at an angle.

In some implementations, the angle is approximately equal to 45°.

In some instances, the flexible leg portion includes: a distal portion of the lower portion of the outer side surface, and a distal portion of the lower portion of the inner side surface.

In some examples, each of the distal portion of the lower portion of the outer side surface and the distal portion of the lower portion of the inner side surface are defined by substantially parallel, planar surfaces.

In some implementations, the distal portion of the lower portion of the inner side surface is integral with the proximal portion of the upper portion of the inner side surface.

Collectively, the distal portion of the lower portion of the inner side surface and the proximal portion of the upper portion of the inner side surface defines the second endcap surface engaging portion.

In some instances, the flexible tang portion is defined by a width that is greater than a width of the flexible leg portion.

In some examples, the third endcap surface engaging portion is formed by a portion of the inner side surface that extends substantially perpendicularly from the distal portion of the lower portion of the inner side surface. The third endcap surface engaging portion demarcates the distal portion of the lower portion of the inner side surface from the proximal portion of the lower portion of the inner side surface.

In some implementations, the proximal end of the first portion of the upper portion of the inner side surface forming the upper portion that projects radially inwardly closest to the axis defines a diameter of an upper opening formed by the annular body of the seal. A tip of the proximal portion of the lower portion of the inner side surface forming the flexible tang portion that projects radially inwardly closest to the axis defines a diameter of a lower opening formed by the annular body of the seal.

In some instances, the second endcap surface engaging portion defines a diameter of a passage extending though the annular body of the seal. The passage is defined by a length extending between the first endcap surface engaging portion and the third endcap surface engaging portion. Access to the passage is permitted by either of the upper opening and the lower opening. The diameter formed by the upper opening is less than the diameter formed by the lower opening. The diameter formed by the upper opening and the diameter formed by the lower opening are both less than the diameter formed by the passage.

Another aspect of the disclosure provides an apparatus. The apparatus includes an endcap assembly having an endcap and a seal joined to the endcap. The seal is joined to the endcap by disposing: (1) a first endcap surface engaging portion of the seal substantially adjacent the upper surface of the endcap, (2) the second endcap surface engaging portion of the seal substantially adjacent the outer side surface of the endcap, and (3) the third endcap surface engaging portion of the seal substantially adjacent the lower surface of the endcap.

In some examples, the endcap includes an annular body having an upper surface and a lower surface. The endcap includes an outer side surface and an inner side surface joining the upper surface to the lower surface.

In some implementations, the annular body of the endcap defines a height. The height of the endcap extends between the upper surface of the annular body of the endcap and the lower surface of the annular body of the endcap. The height of the endcap is slightly less than the length of the passage extending between the first endcap surface engaging portion and the third endcap surface engaging portion.

In some instances, the annular body of the endcap defines a thickness. The thickness is less than a length of the third endcap surface engaging portion of the annular body of the seal.

In yet another aspect of the disclosure provides a method for forming an endcap assembly including the steps of: arranging an upper surface of the endcap opposite a lower opening formed by the annular body of the seal; inserting the endcap into the lower opening formed by the annular body of the seal such that a flexible tang portion of the lower portion of the annular body of the seal is permitted to flex in an axial direction toward the first endcap surface engaging portion as a flexible leg portion of the lower portion of the annular body of the seal is permitted to flex in a radially-outwardly direction away from a central axis; disposing the endcap within a passage formed by the annular body of the seal; arranging the upper surface of the endcap adjacent the first endcap surface engaging portion of the seal such that the flexible tang portion of the lower portion of the annular body of the seal is permitted to flex in an axial direction away from the first endcap surface engaging portion as the flexible leg portion of the lower portion of the annular body of the seal is permitted to flex in a radially-inwardly direction toward from the axis for containing the endcap within the passage formed by the annular body of the seal such that: (1) the upper surface of the endcap is arranged substantially adjacent the first endcap surface engaging portion, (2) the outer side surface of the endcap is arranged substantially adjacent the second endcap surface engaging portion, and (3) the lower surface of the endcap is arranged substantially adjacent the third endcap surface engaging portion.

In even yet another aspect of the disclosure provides an apparatus including a filter assembly including filter media that is arranged between a first endcap and a lower endcap.

In some examples, the filter media includes a circumscribing ring of perforated material.

DETAILED DESCRIPTION

The figures illustrate an exemplary implementation of a seal, endcap assembly and a filter assembly. Based on the foregoing, it is to be generally understood that the nomenclature used herein is simply for convenience and the terms used to describe the invention should be given the broadest meaning by one of ordinary skill in the art.

FIGS. 1-5 illustrate an exemplary implementation of a seal, which is shown generally at 10. The seal 10 includes an annular body 12 having an upper surface 12$a$ and a lower surface 12$b$. The annular body 12 also includes an outer side surface 12$c$ and an inner side surface 12$d$ that join the upper surface 12$a$ to the lower surface 12$b$. An axis, A-A, is shown projecting through an axial center of the seal 10.

Figure 2:
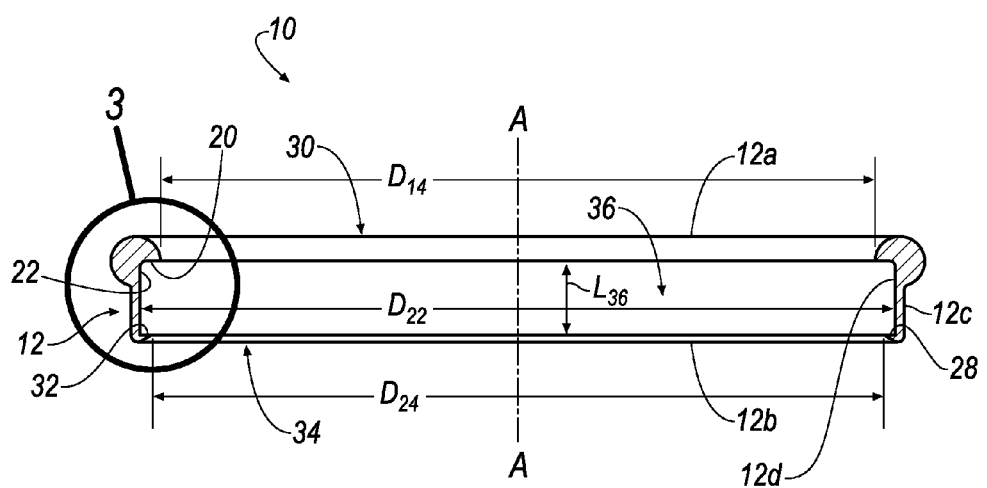
FIG. 2 is a cross-sectional view of the seal of FIG. 1 according to line 2-2.
Figure 3:
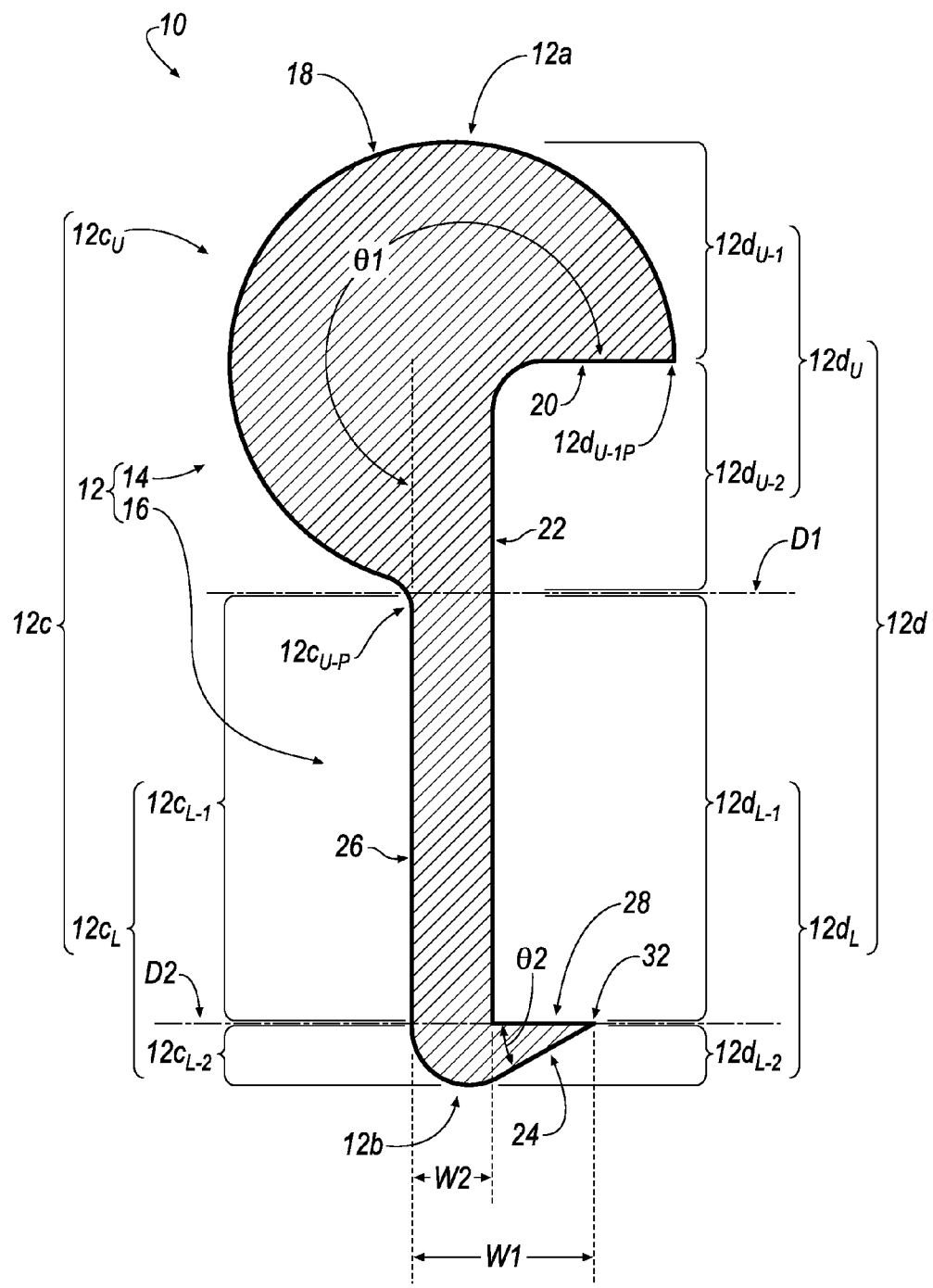
FIG. 3 is an enlarged, cross-sectional view of the seal of FIG. 2 according to line 3.
Figure 4:
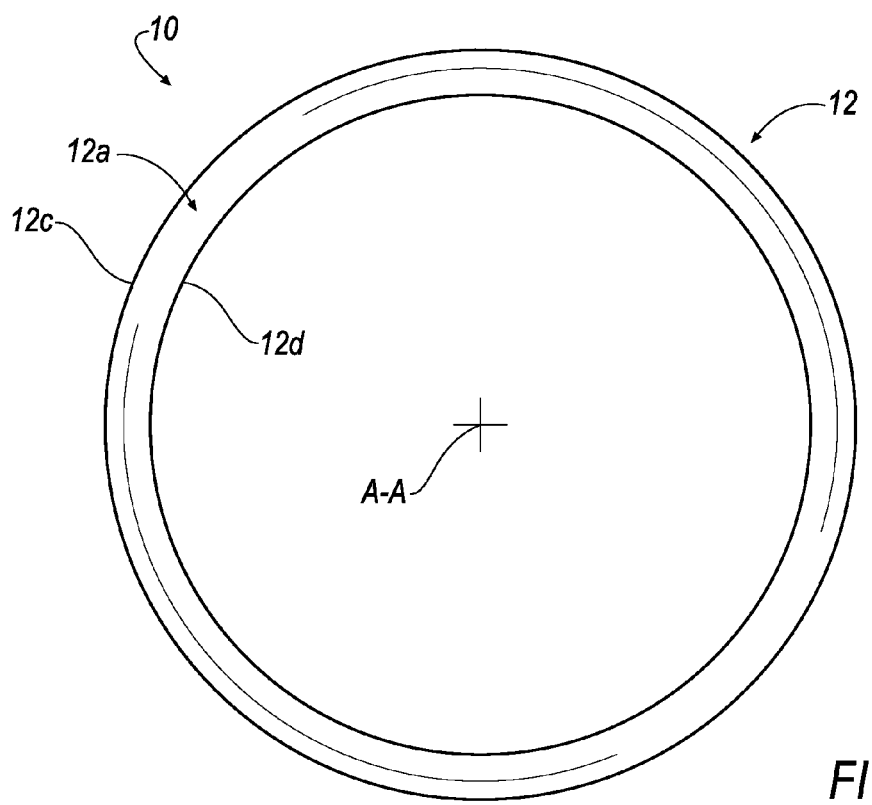
FIG. 4 is a top view of the seal of FIG. 1.
Figure 5:
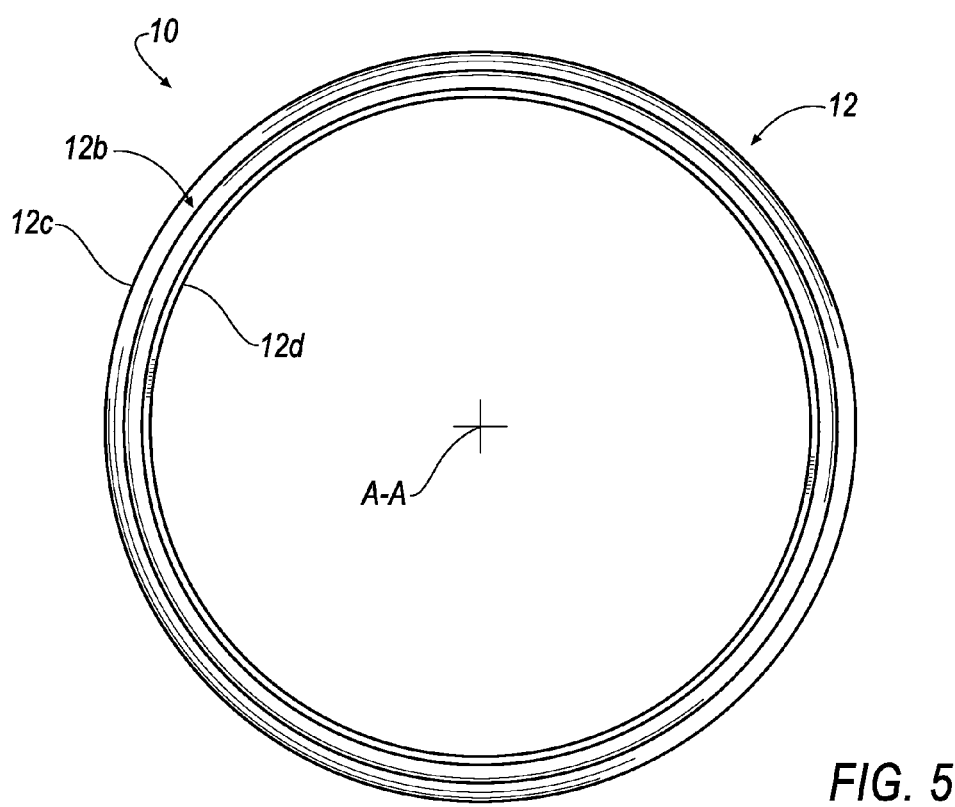
FIG. 5 is a bottom view of the seal of FIG. 1.
Figure 6:
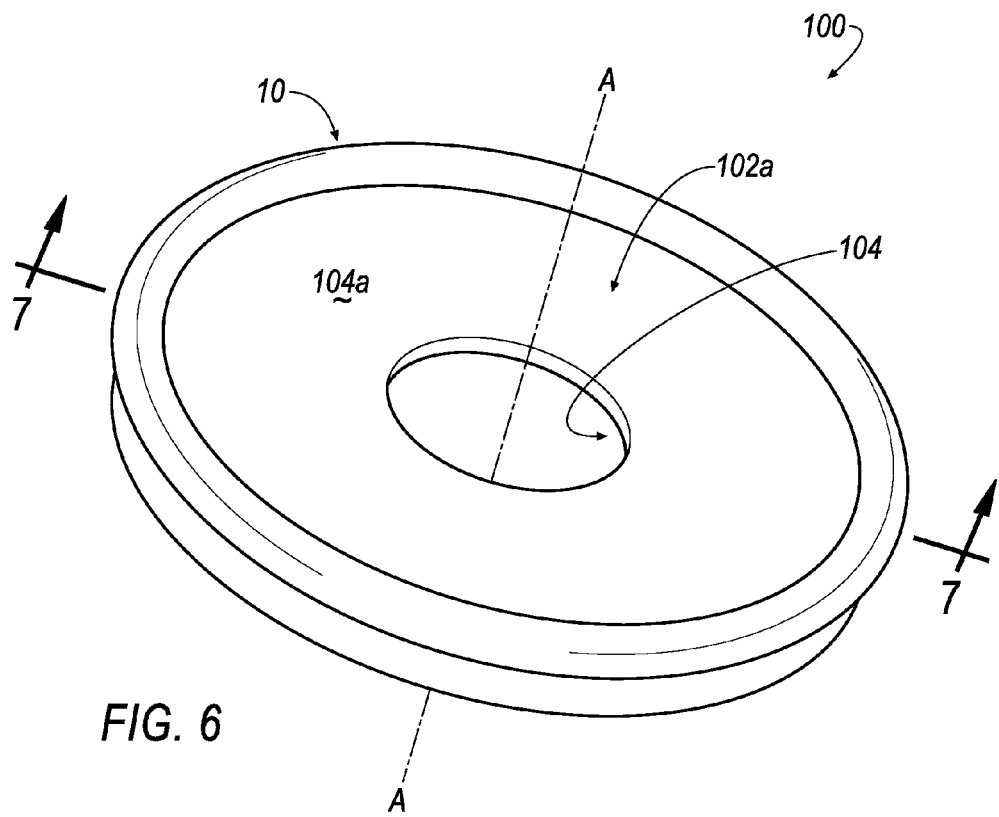
FIG. 6 is a perspective view of an exemplary endcap assembly including an endcap and the seal of FIGS. 1-5.

Referring to FIGS. 2-3, each of the upper surface 12$a$, the lower surface 12$b$, the outer side surface 12$c$ and the inner side surface 12$d$ contribute to defining a geometric cross-sectional profile of the annular body 12 of the seal 10. In some instances, the geometric cross-sectional profile may remain substantially constant for an entire circumference of the seal 10. As seen in FIG. 3, the annular body 12 of the seal 10 may include an upper portion 14 connected to a lower portion 16 (noting that the upper portion 14 and the lower portion 16 are demarcated by a dashed line, D1, for illustrative purposes). The upper portion 14 may be defined by: (1) the upper surface 12$a$, (2) an upper portion 12$c_U$ of the outer side surface 12$c$ and (3) an upper portion 12$d_U$ of the inner side surface 12$d$. The lower portion 16 may be defined by: (1) the lower surface 12$b$, (2) a lower portion 12$c_L$ of the outer side surface 12$c$ and (3) a lower portion 12$d_L$ of the inner side surface 12$d$.

The upper portion 14 of the annular body 12 of the seal 10 is defined by a rounded seal portion 18. The rounded seal portion 18 includes: (1) all of the upper portion 12$c_U$ of the outer side surface 12$c$, (2) the upper surface 12$a$, and (3) a distal portion 12$d_{U-1}$ of the upper portion 12$d_U$ of the inner side surface 12$d$. The rounded seal portion 18 extends from a proximal end 12$c_{U-P}$ of the upper portion 12$c_U$ of the outer side surface 12$c$ to a proximal end 12$d_{U-1P}$ of the distal portion $12d_{U-1}$ of the upper portion $12d_U$ of the inner side surface $12d$ at an angle, θ1. The angle, θ1, may be approximately equal to 270°.

In addition to the distal portion $12d_{U-1}$, the upper portion $12d_U$ of the inner side surface $12d$ is also defined by a proximal portion $12d_{U-2}$. The proximal portion $12d_{U-2}$ of the upper portion $12d_U$ of the inner side surface $12d$ contributes to defining an endcap-engaging surface of the seal 10 including: a first endcap surface engaging portion 20 that is sized for engaging a portion of an upper surface (see, e.g., 104a in FIGS. 7-8C) of an endcap (see, e.g., 102a in FIGS. 7-8C) and a second endcap surface engaging portion 22 that is sized for engaging an outer side surface (see, e.g., 104c in FIGS. 7-8C) of the endcap.

The lower portion 16 of the annular body 12 of the seal 10 is defined by a flexible tang portion 24 and a flexible leg portion 26. The flexible leg portion 26 is connected to and extends away from the rounded seal portion 18. The flexible tang portion 24 is connected to and extends away from the flexible leg portion 26.

The flexible tang portion 24 includes: (1) a proximal portion $12c_{L-2}$ of the lower portion $12c_L$ of the outer side surface 12c, (2) the lower surface 12b, and (3) a proximal portion $12d_{L-2}$ of the lower portion $12d_L$ of the inner side surface $12d$. The proximal portion $12c_{L-2}$ of the lower portion $12c_L$ of the outer side surface 12c may be defined by a rounded surface portion. The proximal portion $12d_{L-2}$ of the lower portion $12d_L$ of the inner side surface $12d$ may be defined by a substantially planar surface portion that extends away from the lower surface 12b at an angle, θ2. The angle, θ2, may be approximately equal to 45°.

The flexible leg portion 26 includes: (1) a distal portion $12c_{L-1}$ of the lower portion $12c_L$ of the outer side surface 12c, and (2) a distal portion $12d_{L-1}$ of the lower portion $12d_L$ of the inner side surface $12d$. Each of the distal portion $12c_{L-1}$ of the lower portion $12c_L$ of the outer side surface 12c and the distal portion $12d_{L-1}$ of the lower portion $12d_L$ of the inner side surface $12d$ may be defined by substantially parallel, planar surfaces. The distal portion $12d_{L-1}$ of the lower portion $12d_L$ of the inner side surface $12d$ is integral with the proximal portion $12d_{U-2}$ of the upper portion $12d_U$ of the inner side surface $12d$. Collectively, the distal portion $12d_{L-1}$ of the lower portion $12d_L$ of the inner side surface $12d$ and the proximal portion $12d_{U-2}$ of the upper portion $12d_U$ of the inner side surface $12d$ defines the second endcap surface engaging portion 22.

As seen in FIG. 3, the flexible tang portion 24 and the flexible leg portion 26 are demarcated by a dashed line, D2, for illustrative purposes. Because the flexible tang portion 26 is defined by a width, W1, that is greater than a width, W2, of the flexible leg portion 26, the lower portion 16 of the annular body 12 of the seal 10 may further define the endcap-engaging surface of the seal 10 that is defined by a third endcap surface engaging portion 28 that is sized for engaging a lower surface (see, e.g., 104b in FIGS. 7-8C) of the endcap. As seen in FIG. 3, the third endcap surface engaging portion 28 is formed by a portion of the inner side surface $12d$ that extends substantially perpendicularly from the distal portion $12d_{L-1}$ of the lower portion $12d_L$ of the inner side surface $12d$. As seen in FIG. 3, the third endcap surface engaging portion 28 demarcates the distal portion $12d_{L-1}$ of the lower portion $12d_L$ of the inner side surface $12d$ from the proximal portion $12d_{L-2}$ of the lower portion $12d_L$ of the inner side surface $12d$.

Referring to FIG. 2, the proximal end $12d_{U-1P}$ of the first portion $12d_{U-1}$ of the upper portion $12d_U$ of the inner side surface $12d$ forming the upper portion 14 that projects radially inwardly closest to the axis, A-A, may define a dimension (e.g., a diameter, $D_{14}$) of an upper opening 30 formed by the annular body 12 of the seal 10. With further reference to FIG. 2, a tip 32 of the proximal portion $12d_{L-2}$ of the lower portion $12d_L$ of the inner side surface $12d$ forming the flexible tang portion 24 that projects radially inwardly closest to the axis, A-A, may define a dimension (e.g., a diameter, $D_{24}$) of a lower opening 34 formed by the annular body 12 of the seal 10.

As seen in FIG. 2, the second endcap surface engaging portion 22 may define a dimension (e.g., a diameter, $D_{22}$) of a passage 36 extending though the annular body 12 of the seal 10. The passage 36 may be defined by a length, $L_{36}$, extending between the first endcap surface engaging portion 20 and the third endcap surface engaging portion 28. Access to the passage 36 is permitted by either of the upper opening 30 and the lower opening 34. The diameter, $D_{14}$, formed by the upper opening 30 may be less than the diameter, $D_{24}$, formed by the lower opening 34. The diameter, $D_{14}$, formed by the upper opening 30 and the diameter, $D_{24}$, formed by the lower opening 34 are both less than the diameter, $D_{22}$, formed by the passage 36.

Referring to FIGS. 6-8C, an exemplary endcap assembly is shown generally at 100. The endcap assembly 100 includes the seal 10 and an endcap 102a. The endcap 102a includes an annular body 104 having an upper surface 104a and a lower surface 104b. The endcap 102a also includes an outer side surface 104c and an inner side surface 104d joining the upper surface 104a to the lower surface 104b.

Figure 7:
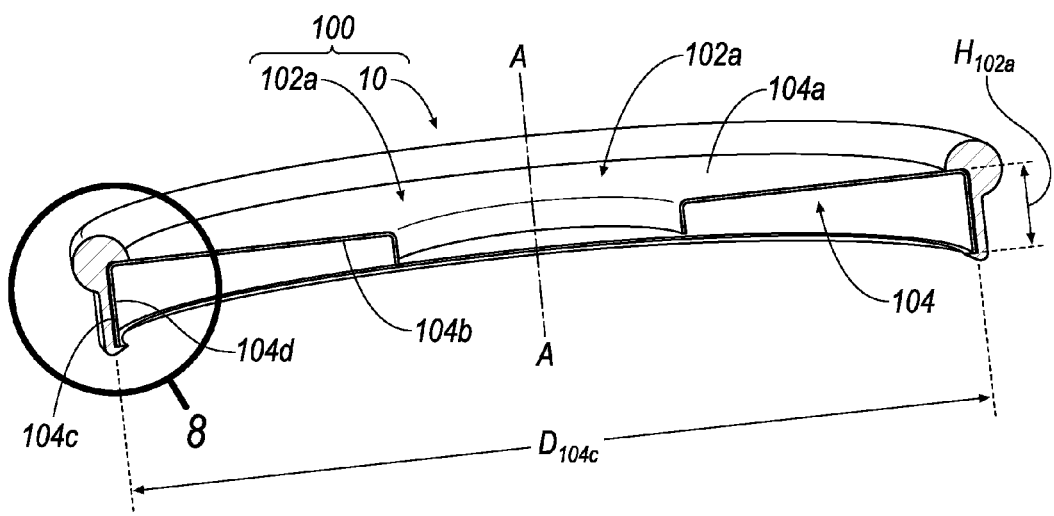
FIG. 7 is a cross-sectional view of the endcap assembly of FIG. 6 according to line 7-7.

Referring to FIG. 7, the outer side surface 104c may define a dimension (e.g., a diameter, $D_{104c}$) of the annular body 104 of the endcap 102a. The diameter, $D_{104c}$, of the annular body 104 of the endcap 102a is greater than both of the diameter, $D_{14}$, formed by the upper opening 30 formed by the annular body 12 of the seal 10 and the diameter, $D_{24}$, formed by the lower opening 34 formed by the annular body 12 of the seal 10; however, the diameter, $D_{104c}$, of the annular body 104 of the endcap 102a is slightly less than the diameter, $D_{22}$, formed by the passage 36 formed by the annular body 12 of the seal 10.

With continued reference to FIG. 7, the annular body 104 of the endcap 102a defines a height, $H_{102a}$. The height, $H_{102a}$, of the endcap 102a extends between the upper surface 104a of the annular body 104 of the endcap 102a and the lower surface 104b of the annular body 104 of the endcap 102a. The height, $H_{102a}$, of the endcap 102a is slightly less than the length, $L_{36}$, of the passage 36 extending between the first endcap surface engaging portion 20 and the third endcap surface engaging portion 28.

Figure 8A:
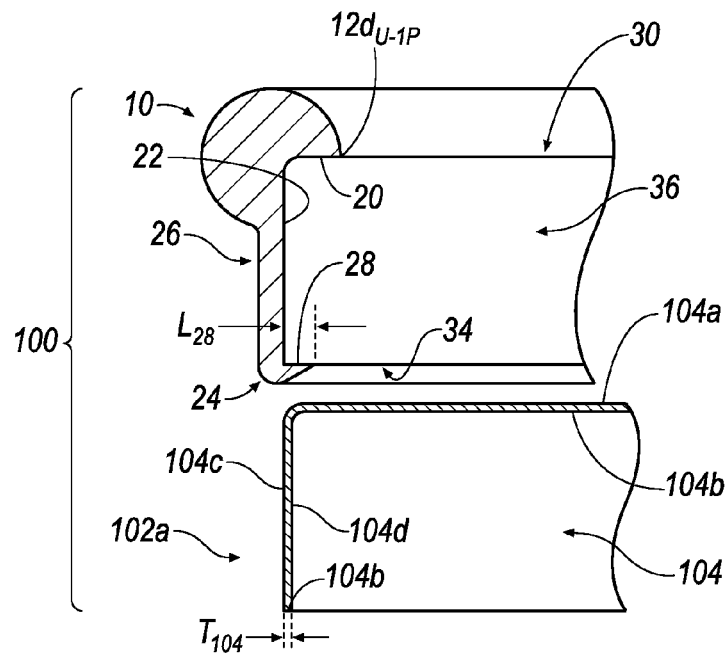
FIG. 8A is an enlarged, exploded, cross-sectional view of the endcap assembly of FIG. 6 referenced from line 8 of FIG. 7.

Referring to FIG. 8A, the annular body 104 of the endcap 102a defines a thickness, $T_{104}$ (see, e.g., FIG. 8A). The thickness, $T_{104}$, is less than a length, $L_{28}$, of the third endcap surface engaging portion 28 of the annular body 12 of the seal 10.

Figure 8B:
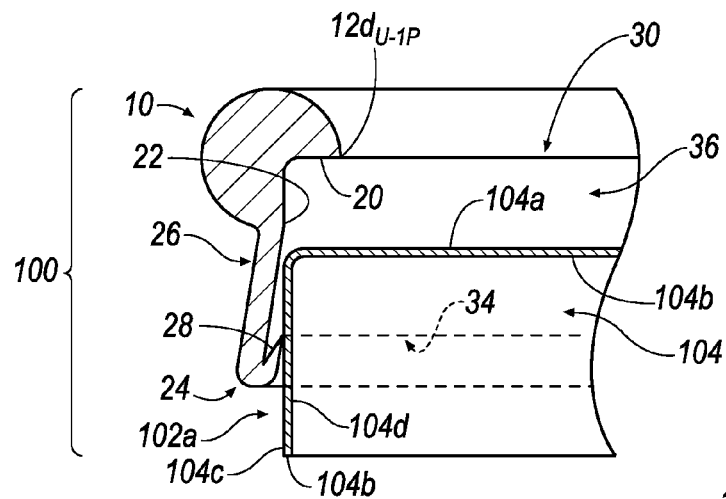
FIG. 8B is an enlarged, partially assembled, cross-sectional view of the endcap assembly of FIG. 6 referenced from line 8 of FIG. 7.
Figure 8C:
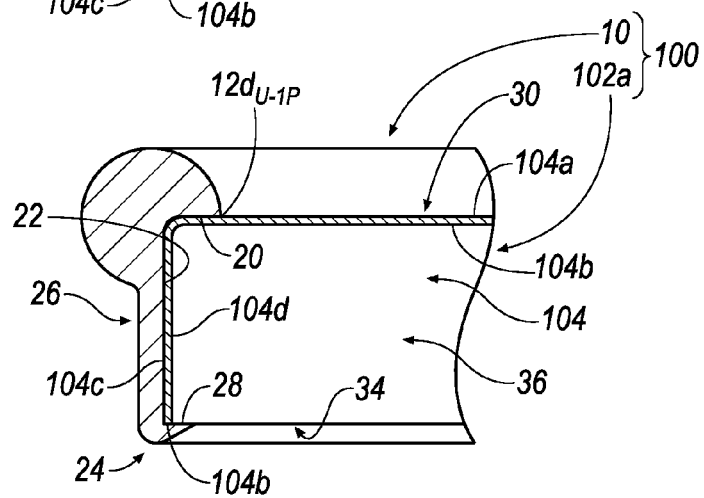
FIG. 8C is an enlarged cross-sectional view of the endcap assembly of FIG. 6 according to line 8 of FIG. 7.
Figure 9:
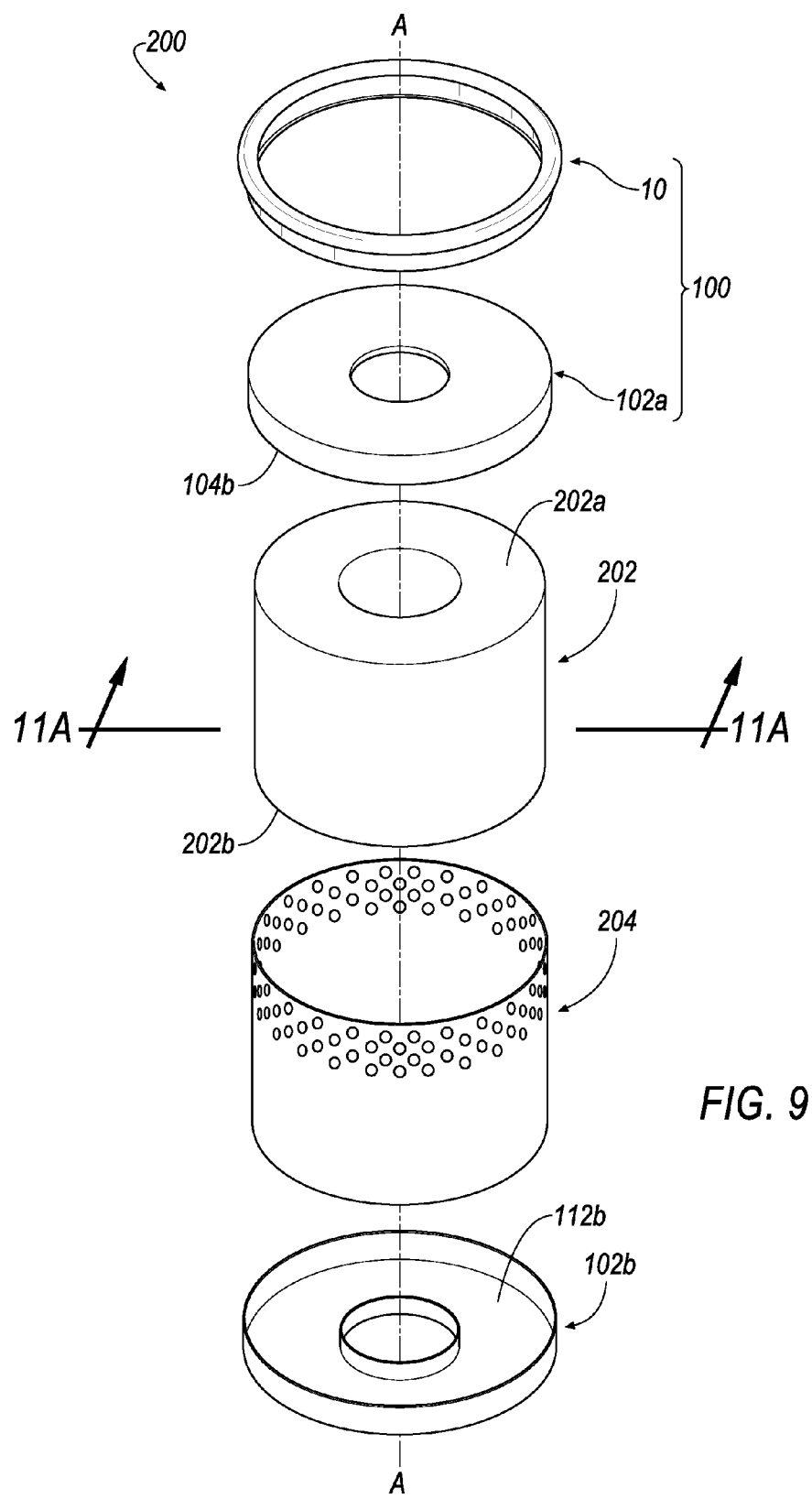
FIG. 9 is an exploded perspective view of an exemplary filter assembly including the endcap assembly of FIGS. 6-8C.
Figure 10:
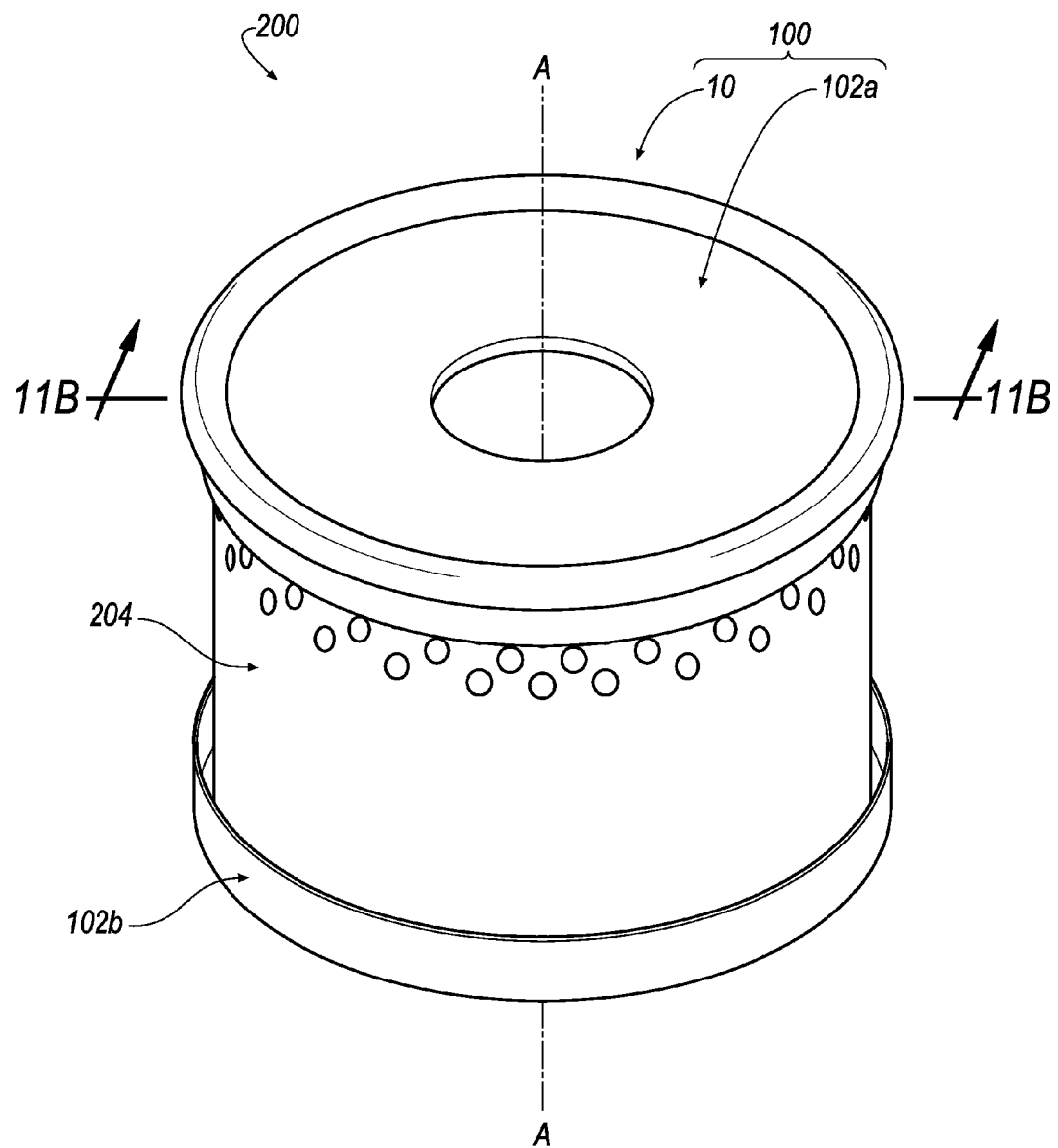
FIG. 10 is an assembled perspective view of the filter assembly of FIG. 9.
Figure 11A:
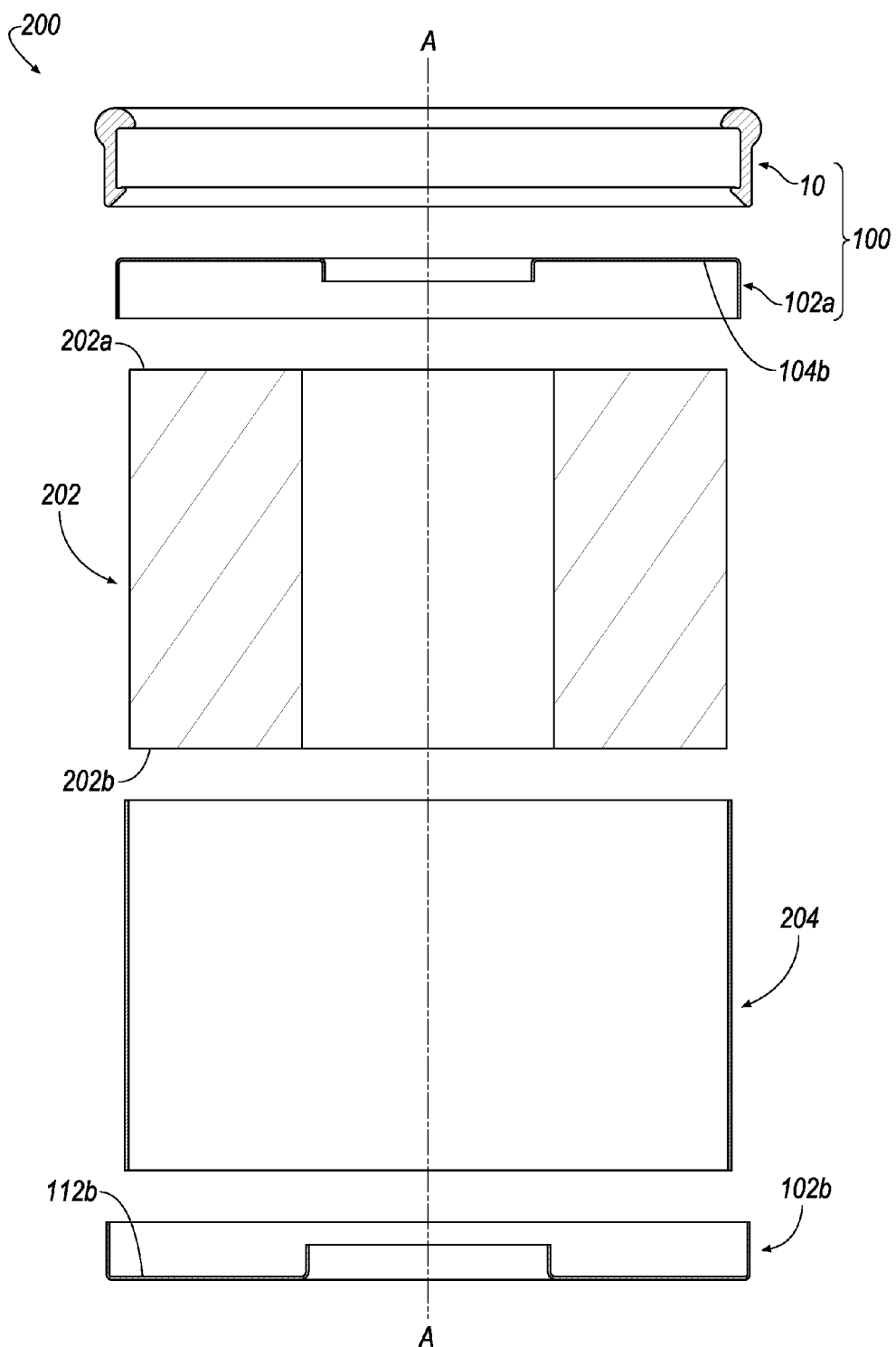
FIG. 11A is an exploded, cross-sectional view of the filter assembly of FIG. 9 according to line 11A-11A.
Figure 11B:
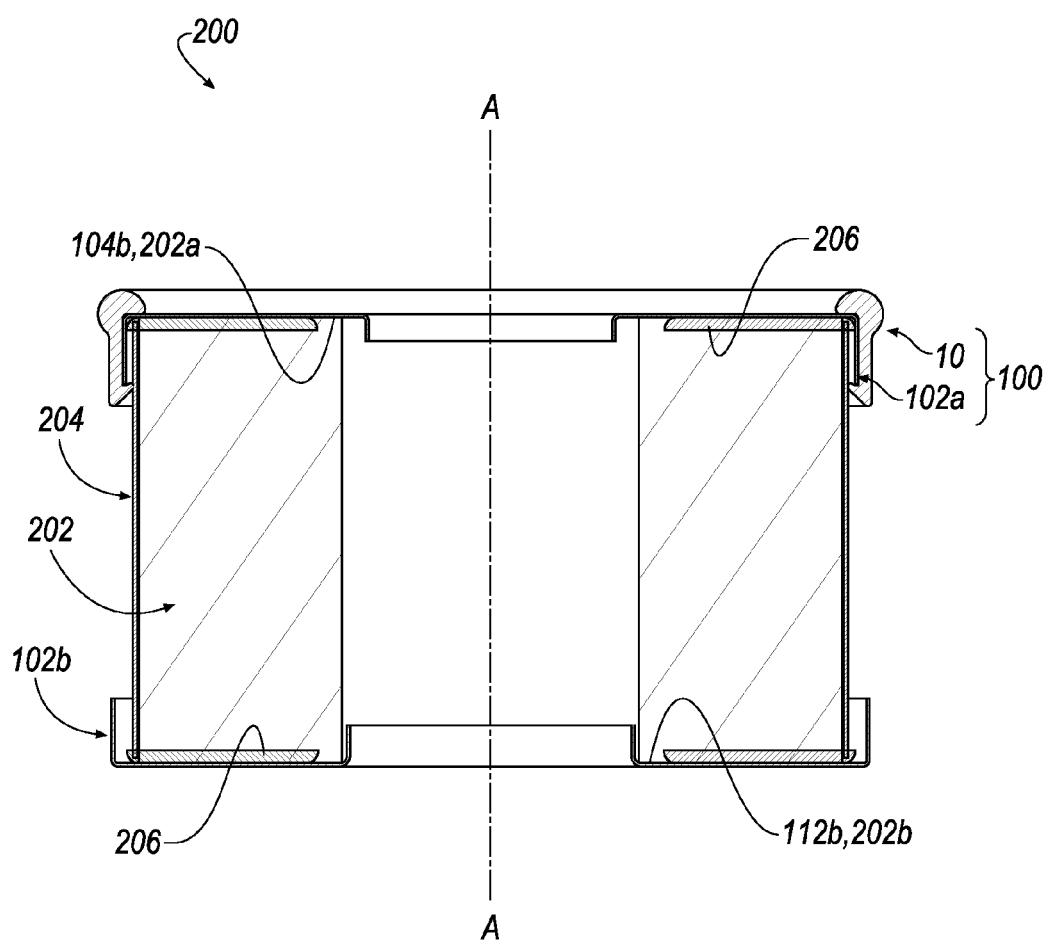
FIG. 11B is an assembled, cross-sectional view of the filter assembly of FIG. 10 according to line 11B-11B.

Referring to FIGS. 8A-8C, an exemplary embodiment of a method for assembling the endcap assembly 100 is shown. Firstly, as seen in FIG. 8A, the upper surface 104a of the endcap 102a is arranged opposite the lower opening 34 formed by the annular body 12 of the seal 10. Then, as seen in FIG. 8B, the endcap 102a is partially disposed within the passage 36 formed by the annular body 12 of the seal 10; because the diameter, $D_{104c}$, of the annular body 104 of the endcap 102a is greater than the diameter, $D_{24}$, formed by the lower opening 34 formed by the annular body 12 of the seal 10, and, because the annular body 12 of the seal 10 is formed with a non-rigid, flexible material (e.g., plastisol, urethane, or the like), the flexible tang portion 24 is permitted to flex in an axial direction toward the first endcap surface engaging portion 20 as the flexible leg portion 26 is permitted to flex in a radially-outwardly direction away from the axis, A-A. As the endcap 102a is further advanced through the passage 36, the endcap 102a is not permitted to exit the passage 36 by way of the upper opening 30 formed by the annular body 12 of the seal 10 due to the proximal end $12d_{U-1P}$ of the first portion $12d_{U-1}$ of the upper portion $12d_U$ of the inner side surface $12d$ forming the upper portion 14 projecting sufficiently radially inwardly toward the axis, A-A.

Referring to FIG. 8C, as the endcap 102a is arranged within the passage 36 as described above, the upper surface 104a of the endcap 102a may subsequently be arranged adjacent the first endcap surface engaging portion 20. Once the upper surface 104a of the endcap 102a is arranged adjacent the first endcap surface engaging portion 20, the flexible tang portion 24 is permitted to flex in an axial direction away from the first endcap surface engaging portion 20 as the flexible leg portion 26 is permitted to flex in a radially-inwardly direction toward from the axis, A-A. As a result of the flexible tang portion 24 flexing in an axial direction away from the first endcap surface engaging portion 20 and the flexible leg portion 26 flexing in a radially-inwardly direction toward from the axis, A-A, as described above, the endcap 102a may be contained within the passage 36 formed by the annular body 12 of the seal 10 such that: (1) the upper surface 104a of the endcap 102a may be arranged substantially adjacent the first endcap surface engaging portion 20, (2) the outer side surface 104c of the endcap 102a may be arranged substantially adjacent the second endcap surface engaging portion 22, and (3) the lower surface 104b of the endcap 102a may be arranged substantially adjacent the third endcap surface engaging portion 28.

FIGS. 9-11B illustrate an exemplary implementation of a filter assembly, which is shown generally at 200. The filter assembly 200 includes filter media 202 that is arranged between the endcap 102a of the endcap assembly 100 and an endcap 102b. The filter media 202 may also include a circumscribing ring of perforated material 204.

The endcap 102a of the endcap assembly 100 may hereinafter be referred to as a "first endcap" or an "upper endcap." A portion of the lower surface 104b of the upper endcap 102a is disposed adjacent an upper end/distal end 202a of the filter media 202.

The endcap 102b may hereinafter be referred to as a "second endcap" or a "lower endcap." An upper surface 112a of the lower endcap 102b is disposed adjacent a lower end/proximal end 202b of the filter media 202.

Any desirable material, such as, for example, an adhesive 206 (see, e.g., FIG. 11B), may be utilized for joining: (1) the portion of the lower surface 104b of the upper endcap 102a adjacent the upper distal end 202a of the filter media 202, and (2) the upper surface 112a of the lower endcap 102b adjacent the proximal end 202b of the filter media 202. The central axis, A-A, may axially extend through an axial center of each of the upper endcap 102a and the lower endcap 102b and the filter media 202.

Figure 12:
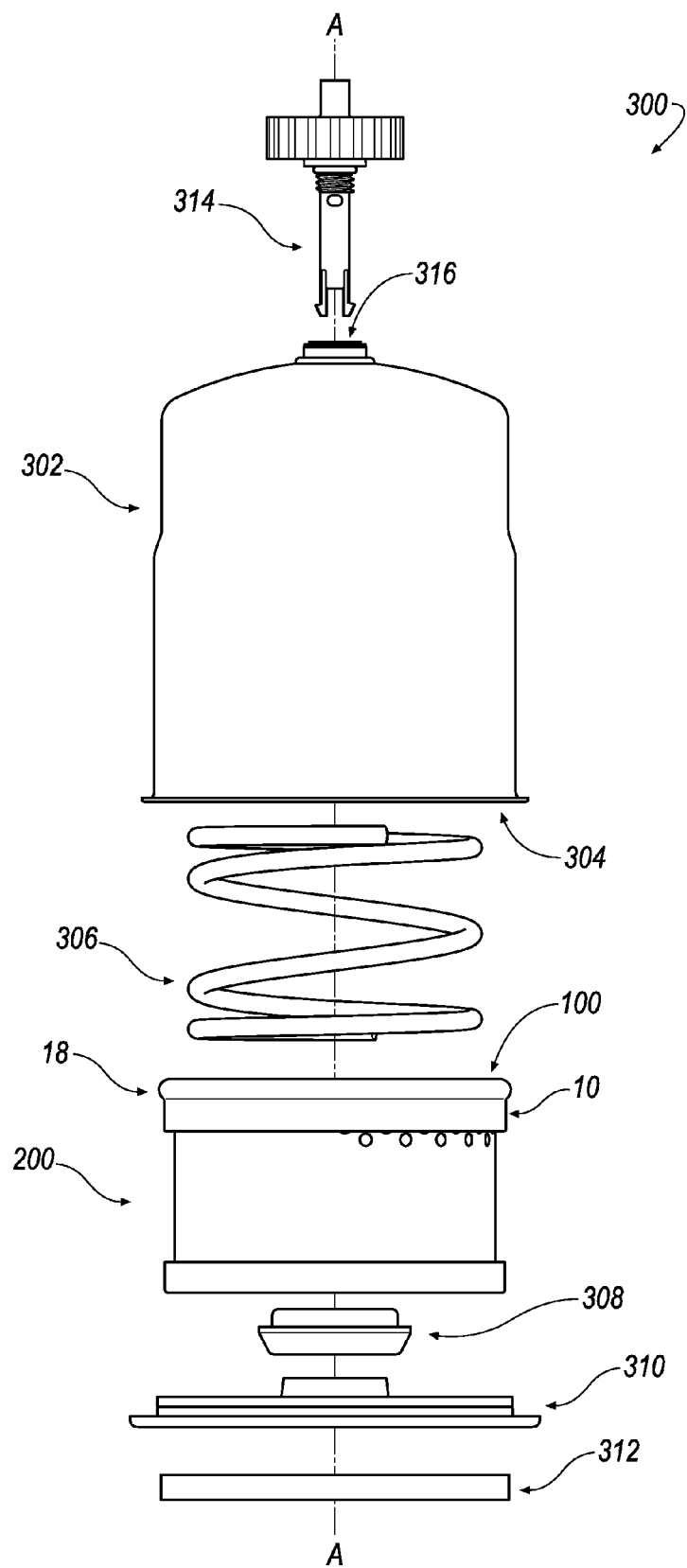
FIG. 12 is a side view of the filter assembly of FIGS. 9-11B and an exploded side view of structure that receives and subsequently contains the filter assembly.

FIG. 12 illustrates an exemplary implementation of an enclosure assembly 300 that contains the filter assembly 200. The enclosure assembly 300 includes a canister 302 including a cavity (not shown). Access to the cavity is permitted by a first opening 304 formed in the canister 302.

The filter assembly 200 is disposed within the cavity between a spring member 306 and a support element 308. Once the spring member 306, the filter assembly 200 and the support element 308 are disposed within the cavity, a cover plate 310 is arranged over the first opening 304 to thereby close-out the opening 304 for retaining the spring member 306, the filter assembly 200 and the support element 308 within the cavity. The rounded seal 18 of the upper portion 14 of the seal 10 may be disposed adjacent an interior surface (not shown) of the cavity for fluidly sealing off a filtering compartment (not shown) formed by the cavity of the canister 302 about the endcap assembly 100.

A gasket 312 may be disposed over the cover plate 310. A valve 314 may be disposed in a second opening 316 that is formed in an end of the canister 302 that is opposite the first opening 304 that receives the cover plate 310.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An apparatus, comprising:
   a seal including an annular body defining an upper opening and a lower opening and having an upper surface and a lower surface, wherein the annular body also includes an outer side surface and an inner side surface that join the upper surface to the lower surface, wherein the inner side surface contributes to defining an endcap-engaging surface of the seal including:
      a first endcap surface engaging portion that is sized for engaging a portion of an upper surface of an endcap,
      a second endcap surface engaging portion that is sized for engaging an outer side surface of the endcap, and
      a third endcap surface engaging portion that is sized for engaging a lower surface of the endcap,
   wherein the annular body includes an upper portion connected to a lower portion, wherein the upper portion of the annular body of the seal is defined by
      a rounded seal portion, wherein the lower portion of the annular body of the seal is defined by
      a flexible tang portion and a flexible leg portion, wherein the flexible leg portion is connected to and extends away from the rounded seal portion, wherein the flexible tang portion is connected to and extends away from the flexible leg portion, and
   wherein the second endcap surface engaging portion defines a diameter of a passage extending though the annular body of the seal, wherein the passage is defined by a length extending between the first endcap surface engaging portion and the third endcap surface engaging portion, wherein access to the passage is permitted by either of the upper opening and the lower opening, wherein a diameter formed by the upper opening is less than a diameter formed by the lower opening, wherein the diameter formed by the upper opening and the diameter formed by the lower opening are both less than a diameter formed by the passage.

2. The apparatus of claim 1, wherein the annular body defines a geometric cross-sectional profile.

3. The apparatus of claim 2, wherein the geometric cross-sectional profile remains substantially constant for an entire circumference of the seal.

4. The apparatus of claim 1, wherein the upper portion is defined by:
   the upper surface, an upper portion of the outer side surface, and
an upper portion of the inner side surface.

5. The apparatus of claim 1, wherein the lower portion is defined by:
the lower surface,
a lower portion of the outer side surface, and
a lower portion of the inner side surface.

6. The apparatus of claim 1, wherein the rounded seal portion includes:
all of the upper portion of the outer side surface,
the upper surface, and
a distal portion of the upper portion of the inner side surface.

7. The apparatus of claim 6, wherein the rounded seal portion extends from
a proximal end of the upper portion of the outer side surface to
a proximal end of the distal portion of the upper portion of the inner side surface at an angle.

8. The apparatus of claim 7, wherein the angle is approximately equal to 270°.

9. The apparatus of claim 7, wherein, in addition to the distal portion of the upper portion of the inner side surface, the upper portion of the inner side surface is also defined by a proximal portion, the proximal portion of the upper portion of the inner side surface defining the first endcap surface engaging portion and a portion of the second endcap surface engaging portion.

10. The apparatus of claim 1, wherein the flexible tang portion includes:
a proximal portion of the lower portion of the outer side surface,
the lower surface, and
a proximal portion of the lower portion of the inner side surface.

11. The apparatus of claim 10, wherein the proximal portion of the lower portion of the outer side surface is defined by
a rounded surface portion, wherein the proximal portion of the lower portion of the inner side surface is defined by
a substantially planar surface portion that extends away from the lower surface at an angle.

12. The apparatus of claim 11, wherein the angle is approximately equal to 45°.

13. The apparatus of claim 9, wherein the flexible leg portion includes:
a distal portion of the lower portion of the outer side surface, and
a distal portion of the lower portion of the inner side surface.

14. The apparatus of claim 13, wherein each of the distal portion of the lower portion of the outer side surface and the distal portion of the lower portion of the inner side surface are defined by substantially parallel, planar surfaces.

15. The apparatus of claim 14, wherein the distal portion of the lower portion of the inner side surface is integral with the proximal portion of the upper portion of the inner side surface, wherein collectively, the distal portion of the lower portion of the inner side surface and the proximal portion of the upper portion of the inner side surface defines the second endcap surface engaging portion.

16. The apparatus of claim 1, wherein the flexible tang portion is defined by a width that is greater than a width of the flexible leg portion.

17. The apparatus of claim 13, wherein the third endcap surface engaging portion is formed by a portion of the inner side surface that extends substantially perpendicularly from the distal portion of the lower portion of the inner side surface, wherein the third endcap surface engaging portion demarcates the distal portion of the lower portion of the inner side surface from the proximal portion of the lower portion of the inner side surface.

18. The apparatus of claim 7, wherein the proximal end of the distal portion defines
the diameter of the upper opening formed by the annular body of the seal, wherein a tip of the proximal portion of the lower portion of the inner side surface forming the flexible tang portion that projects radially inwardly closest to the axis defines
the diameter of the lower opening formed by the annular body of the seal.

19. An apparatus, comprising:
an endcap assembly including:
an endcap, and
the seal of claim 1 joined to the endcap by disposing:
(1) the first endcap surface engaging portion of the seal substantially adjacent an upper surface of the endcap,
(2) the second endcap surface engaging portion of the seal substantially adjacent an outer side surface of the endcap, and
(3) the third endcap surface engaging portion of the seal substantially adjacent a lower surface of the endcap.

20. The apparatus of claim 19, wherein the endcap includes an endcap annular body having an upper surface and a lower surface, wherein the endcap includes an outer side surface and an inner side surface joining the upper surface to the lower surface.

21. The apparatus of claim 20, wherein the outer side surface of the endcap defines a diameter of the annular body of the endcap, wherein the diameter of the annular body of the endcap is greater than both of a diameter formed by an upper opening formed by the annular body of the seal and a diameter formed by a lower opening formed by the annular body of the seal, wherein the diameter of the annular body of the endcap is slightly less than the diameter formed by the passage.

22. The apparatus of claim 21, wherein the annular body of the endcap defines a height, wherein the height of the endcap extends between the upper surface of the annular body of the endcap and the lower surface of the annular body of the endcap, wherein the height of the endcap is slightly less than the length of the passage extending between the first endcap surface engaging portion and the third endcap surface engaging portion.

23. The apparatus of claim 21, wherein the annular body of the endcap defines a thickness, wherein the thickness is less than a length of the third endcap surface engaging portion of the annular body of the seal.

24. A method for forming the apparatus of claim 19, comprising the steps of:
arranging an upper surface of the endcap opposite a lower opening formed by the annular body of the seal;
inserting the endcap into the lower opening formed by the annular body of the seal such that a flexible tang portion of the lower portion of the annular body of the seal is permitted to flex in an axial direction toward the first endcap surface engaging portion as a flexible leg portion of the lower portion of the annular body of the seal is permitted to flex in a radially-outwardly direction away from a central axis;

disposing the endcap within a passage formed by the annular body of the seal;

arranging the upper surface of the endcap adjacent the first endcap surface engaging portion of the seal such that the flexible tang portion of the lower portion of the annular body of the seal is permitted to flex in an axial direction away from the first endcap surface engaging portion as the flexible leg portion of the lower portion of the annular body of the seal is permitted to flex in a radially-inwardly direction toward from the axis for containing the endcap within the passage formed by the annular body of the seal such that:

(1) the upper surface of the endcap is arranged substantially adjacent the first endcap surface engaging portion, (2) the outer side surface of the endcap is arranged substantially adjacent the second endcap surface engaging portion, and (3) the lower surface of the endcap is arranged substantially adjacent the third endcap surface engaging portion.

25. An apparatus, comprising:
a filter assembly including:
includes filter media that is arranged between
a first endcap and a lower endcap, wherein the first endcap is the endcap of the endcap assembly of claim 19.

26. The apparatus of claim 25, wherein the filter media includes a circumscribing ring of perforated material.

\* \* \* \* \*